(12) United States Patent
Bernardini et al.

(10) Patent No.: US 10,172,340 B2
(45) Date of Patent: Jan. 8, 2019

(54) PORTAGE SYSTEM FOR FISHING RODS, SPIKES AND ACCESSORIES

(71) Applicants: Jean-Rene Bernardini, Toulon (FR); Dominique Mattei, Toulon (FR)

(72) Inventors: Jean-Rene Bernardini, Toulon (FR); Dominique Mattei, Toulon (FR)

(*) Notice: Subject to any disclaimer, the term of this patent is extended or adjusted under 35 U.S.C. 154(b) by 165 days.

(21) Appl. No.: 15/189,442

(22) Filed: Jun. 22, 2016

(65) Prior Publication Data
US 2016/0374323 A1    Dec. 29, 2016

(30) Foreign Application Priority Data
Jun. 23, 2015 (FR) .................................. 15 01296

(51) Int. Cl.
*A45F 3/02* (2006.01)
*A01K 97/08* (2006.01)
*A01K 97/10* (2006.01)

(52) U.S. Cl.
CPC .............. *A01K 97/08* (2013.01); *A01K 97/10* (2013.01); *A45F 3/02* (2013.01)

(58) Field of Classification Search
CPC ............ A01K 97/08; A01K 97/10; A45F 3/02
USPC ........................................................ 224/576
See application file for complete search history.

(56) References Cited

U.S. PATENT DOCUMENTS

| | | | | |
|---|---|---|---|---|
| 722,546 A * | 3/1903 | Werle | ..................... | A47G 25/12 211/62 |
| 4,628,628 A | 12/1986 | Burgin et al. | | |
| 4,688,685 A * | 8/1987 | Brace | .................... | A63C 11/028 211/60.1 |
| 5,137,319 A * | 8/1992 | Sauder | ................... | A01K 97/10 206/315.11 |
| 5,718,401 A * | 2/1998 | Walters | .................. | A01K 97/10 248/150 |
| 6,471,103 B1 * | 10/2002 | Frese | ..................... | A01K 97/08 206/249 |
| 6,651,374 B1 * | 11/2003 | Ridlen | .................. | A01K 97/10 248/514 |

(Continued)

FOREIGN PATENT DOCUMENTS

| | | |
|---|---|---|
| CN | 103416358 | 12/2013 |
| CN | 103444669 | 12/2013 |

(Continued)

OTHER PUBLICATIONS

French Search Report for French Application No. FR 1501296, Completed by the French Patent Office dated Apr. 21, 2016, 11 pages.

(Continued)

*Primary Examiner* — Derek Battisti
(74) *Attorney, Agent, or Firm* — Brooks Kushman P.C.

(57) ABSTRACT

A carrying system comprises: a rigid profiled guide, a base sole and a plurality of intermediate plates; with the sole and the plates all extend frontally and transversely from a single front surface of the guide. The guide extends in an elevation direction (Z) and comprises a profiled concave track. A flexible structure for human carrying is attached within the system for grouped transport of rods, stakes and accessories. The invention applies in particular to conventional fishing like surf casting, in particular in a body of water such as, for example, seashore, lakeshore, canal bank and riverbank.

20 Claims, 6 Drawing Sheets

(56) References Cited

U.S. PATENT DOCUMENTS

| | | | | |
|---|---|---|---|---|
| 7,676,983 | B2* | 3/2010 | Jenkins | A01K 97/06 248/512 |
| 8,636,259 | B2* | 1/2014 | Manke | G01N 30/6047 211/78 |
| 9,345,346 | B1* | 5/2016 | O'Flaherty | B65H 75/36 |
| 9,568,289 | B2* | 2/2017 | Macchia | F42B 4/20 |
| 2007/0278166 | A1* | 12/2007 | Morton | A01K 97/08 211/70.8 |
| 2013/0232844 | A1* | 9/2013 | Gallo | A45B 3/00 42/94 |
| 2014/0125075 | A1* | 5/2014 | Xiques | A01K 97/08 294/143 |
| 2014/0196352 | A1 | 7/2014 | Coveyou et al. | |

FOREIGN PATENT DOCUMENTS

| | | |
|---|---|---|
| CN | 103461234 | 12/2013 |
| CN | 203349022 | 12/2013 |
| CN | 203388125 | 1/2014 |
| CN | 203416736 | 2/2014 |
| CN | 203505332 | 4/2014 |
| CN | 103798201 | 5/2014 |
| CN | 203593144 | 5/2014 |
| CN | 203597262 | 5/2014 |
| CN | 203775937 | 8/2014 |
| CN | 203775960 | 8/2014 |
| CN | 203801531 | 9/2014 |
| DE | 202007017027 | 3/2008 |
| JP | H04117582 | 10/1992 |
| JP | H11178495 | 7/1999 |
| JP | 2002325535 | 11/2002 |
| JP | 20005253391 | 9/2005 |
| JP | 2006042718 | 2/2006 |
| JP | 2014140334 | 8/2014 |
| JP | 2014155460 | 8/2014 |
| JP | 5624164 | 11/2014 |
| KR | 20130122050 | 11/2013 |
| KR | 20140034570 | 3/2014 |
| KR | 101381456 | 4/2014 |
| KR | 101434819 | 8/2014 |
| TW | 269626 | 2/1996 |
| TW | M467311 | 12/2013 |
| TW | M479020 | 6/2014 |
| UA | 78954 | 4/2013 |

OTHER PUBLICATIONS

Website http://fr.wikipedia.org/wiki/Surf_casting Wikipedia English Translation attached to orignal, English Translation Last modified on May 8, 2016, Original document last modified dated Apr. 26, 2015, All together 8 Pages. "Surf fishing".

* cited by examiner

PORTAGE SYSTEM FOR FISHING RODS, SPIKES AND ACCESSORIES

CROSS-REFERENCE TO RELATED APPLICATION

This application claims priority to French patent application No. 1501296 filed on Jun. 23, 2015, the disclosure of which is incorporated in its entirety by reference herein.

BACKGROUND OF THE INVENTION (1) Field of the Invention

The invention is generally from the technical domain of recreational fishing and sport fishing accessories.

In particular the invention covers fishing rods and/or support stakes. The invention furthermore covers accessories forming containers or boxes for this domain. In particular, the invention covers a carrying system for at least one rod and/or one stake and/or one fishing accessory.

(2) Description of Related Art

In this domain, many technical problems remain unresolved or incompletely satisfied.

Thus, people practicing recreational or sport fishing must transport one or more fishing rods and/or various stakes and/or accessories near the body of water (for example, seashore, lakeshore, canal bank, riverbank) where they want to fish.

This transport is generally done manually, by people carrying rods, stakes and/or accessories. There is currently no system for carrying rods which makes handling them easy, practical and less fatiguing because of an ergonomic weight, shape, modularity and bulk.

Although fishing rods are telescopic, transport thereof can prove tricky, in particular because the length thereof makes them bulky. Additionally, since the upper tip of the rods is pointed, it can make the handling thereof tricky or even hazardous.

When we talk about support stakes here, it involves "surf casting" stakes, meaning for holding fishing rods with the line in the surf in fishing position. As an aside, clarifications on "surf casting" are available at this link: http://fr.wikipedia.org/wiki/Surf_casting [https://en.wikipedia.org/wiki/Surf_fishing]. Often, these stakes are not telescopic and the pointed lower end thereof can also make handling them risky or hazardous. It would therefore be useful to be able to have a carrying system which minimizes the risks during handling and transport of rods/stakes/accessories, while also providing an organized, safe and compact hold thereof.

This handling and transport is even more cumbersome when the number of rods, stakes and/or accessories is larger. For example, for fishing with the line in the surf ("surf casting"), it is useful to transport rods and as many stakes. Therefore, it would be advantageous to have a carrying system which would allow handling and transport of a sufficient number of rods, stakes and/or accessories and which easily adapts to the shapes and volumes thereof.

Also, during conventional fishing while waiting for a bite, it is constraining to have to hold the rods stably in the hand for sometimes long periods of time. In the same way as "surf casting", where each fishing rod must be positioned stably in the ground by having it rest on the top of a "surf casting" stake, which must be planted in the ground near a body of water where it is possible to fish "in the surf", it is appropriate for conventional fishing to be able to have a rod carrying system which additionally provides this stable holding function.

Additionally, unlike conventional covers which are no longer useful after transport to the body of water, it would be advantageous if a carrying system for rods, stakes and accessories could provide additional functions, for example support, holding and making accessories available, etc.

The number, shape and type of fishing equipment varies according to the type of recreational fishing done, but also according to the ecosystem of the body of water and also the fishing seasons or periods. In fact, from one fishing session to another, a person practicing this activity can need to equip themselves with distinct rods, stakes and accessories. It would be ideal to have a single carrying system which is also modular depending on the specific equipment useful to a planned fishing session.

Beyond the transport of fishing equipment, the practice of this activity also poses various technical problems. For example, conventional covers inside which rods, stakes and accessories can be placed must be laid on the ground in order to be able to access the content. This is impractical and can be bothersome on dirty, wet or loose ground. It is therefore suitable to be able to have a carrying system which has some rigidity and which can keep the rods, stakes and accessories of the person fishing in a raised and nearby position when it is necessary to access them.

Another problem is the relative difficulty of setting up rods, stakes and accessories from the transport position thereof on the carrying system to the position thereof for use, and vice versa. Another unsatisfied need therefore remains for a secure carrying system onto and from which attaching and releasing are easy, quick and protected from risks of untimely opening.

Furthermore, it is important that these rods, stakes and accessories not be damaged during handling thereof, in particular as it involves the fishing reels which are relatively fragile and costly objects. In the same order of ideas, it is important that the rods, stakes and accessories on a carrying system not damage or strike what's around them (whether they be objects, people or animals) during handling thereof. In fact, it is desirable that a carrying system offer effective protection.

Finally, as it involves a recreational activity, it is desirable that the carrying system be low cost, with a structure suited for being made in industrial mass production, which can also be made in various materials and by various production methods. At this time there is no carrying system which addresses these criteria.

Various documents from the domain of recreational fishing-rod carrier systems were considered.

Additionally, the document US2014125075 describes a multiple fishing rod support with a long rigid handle for transport. This support is rigid and comprises two notched base plates which are mounted on the rigid handle at preset fixed locations. Rigid tubes for receiving rods are mounted longitudinally at preset fixed locations between the two baseplates and the outer periphery of these plates. On an upper base plate, feet are hinged in order to keep the support and the rods lodged in the receiving tubes.

Although it has advantages, this multi-rod support must be placed on the ground for loading and unloading thereof. Five rods at most can be impractically attached by threading each into one tube. The bulk of this multi-rod support is relatively voluminous and therefore the support is impractical for transport. It can only be transported in one way, like a suitcase at the end of the arm, which can be demanding depending on the load. No arrangement for accessories and stakes is provided. During transport, the tips of the fishing rods are exposed, which can lead to the alteration thereof or even impacts on neighboring people and objects. A single position near the ground is possible with the legs folded.

The document JP2002325535 describes an adjustable support with vertical foot for several rods mounted on a transverse arm.

The document JP2005253391 describes a level adjustment guide for a fishing rod line.

The document JP2006042718 describes an adjustable support with vertical foot for a single rod and with adjustable assembly along a receiving rail parallel to the vertical foot.

Other documents were considered, specifically: DE202007017027, CN203801531, CN203775960, CN203775937, CN103461234, CN203349022, CN103444669, CN103416358, CN203597262, CN103798201, CN203593144, CN203416736, CN203388125, CN203505332, JPH11178495, JP5624164, JP2014140334, JP2014155460, JPH04117582, KR20130122050, KR101434819, KR101381456, KR20140034570, TWM467311, TW269626, TWM479020, UA78954U, U.S. Pat. No. 4,628,628, US2007278166 and US2014196352.

BRIEF SUMMARY OF THE INVENTION

The invention aims to resolve the problems encountered with the current carrying systems, in particular in terms of ease of handling, practicality/variety/modularity of the functions provided, safety for the user and those nearby, and possibilities for industrial production at reasonable cost.

For this reason, the invention is seen through various purposes.

A purpose of the invention is a carrying system for fishing accessories.

This carrying system comprises at least: a profiled rigid guide, a base sole and a plurality of intermediate plates; the base sole and the intermediate plates all extend from a single front surface of the profiled rigid guide, in a frontal direction of the carrying system.

The profiled rigid guide extends in an elevation direction of the carrying system and comprises a base elevation end and a summit elevation end; the profiled rigid guide comprises a profiled concave track between the base and summit elevation ends.

The base sole extends perpendicularly to the elevation direction from the base elevation end and is rigidly attached to the profiled rigid guide.

Each intermediate plate is planar and extends perpendicularly to the elevation direction and adjustably in the elevation direction between the base sole and the summit elevation end, with at least:

One intermediate base plate which is rigidly attached on an upper surface of the base sole, where this upper surface comprises at least two base receiving housings, each base receiving housing is at a set location in the frontal direction and a transverse direction of the carrying system, and each receiving housing is disposed on either side in the transverse direction of the profiled concave track;

One intermediate tip threading plate which is rigidly attached on the profiled concave track by a lower adjustable arrangement for elevation adjustment where the intermediate threading plate is provided with at least two through holes, respectively in a line with a corresponding base receiving housing;

One intermediate immobilizing plate which is rigidly attached on the track by a middle adjustable arrangement for elevation adjustment, where this plate is provided with at least two lateral openings, each respectively above, and frontally and transversely offset from a housing and facing a corresponding through hole; each lateral opening with an axis extending in the elevation direction is respectively disposed to a transverse end part of the intermediate immobilizing plate and has an elastically deformable clip mechanism with transverse passage opening out towards the outside of the intermediate immobilizing plate, in the transverse direction; and the intermediate immobilizing plate has at least two upper support ranges, each in the periphery of a lateral opening.

According to an implementation, the intermediate tip confinement plate is rigidly attached on the profiled concave track by an upper adjustable arrangement for elevation adjustment. The intermediate tip confinement plate is provided with at least two lateral tip protection throats. Each lateral tip protection throat is respectively across from a tip receiving housing and has an axis extending in the elevation direction. Additionally, each lateral tip protection throat is respectively disposed on a transverse side of the intermediate tip confinement plate forming an arced receptacle opening out in the transverse direction towards the outside of the carrying system.

According to an implementation, the profiled rigid guide comprises at least one carrying strap rigidly connected both to the base sole and also to the upper adjustable arrangement, where the carrying strap is made rigidly connected by attachment to the base sole and to the upper adjustable arrangement on the rear surface of the profiled rigid guide opposite in the frontal direction to the intermediate plates.

According to an implementation, the base sole comprises on a lower surface at least 3 feet projecting to the outside of the carrying system in the elevation direction.

According to an implementation, the intermediate base plate comprises three base receiving housings, disposed in a triangle whose base is parallel to the transverse direction and whose point opposite the base in the frontal direction defines a central base receiving housing in front of the base and opposite the profiled rigid guide in the frontal direction.

According to an implementation, the intermediate threading plate comprises three through holes opposite the three base receiving housings disposed on the intermediate base plate in a triangle whose base is parallel to the transverse direction.

According to an implementation, the intermediate immobilizing plate has a "T" shape perpendicular to the elevation direction and comprises at least four lateral openings with an elastically deformable clip mechanism with transverse passage opening out towards the outside and also two central lateral openings aligned in the frontal direction.

According to an implementation, each elastically deformable clip mechanism with transverse passage opening out from the intermediate immobilizing plate comprises a V-shaped bottom jointly molded with the intermediate immobilizing plate and two hook shaped elastically deformable tabs, one opposite the other in a frontal and transverse median plane of the intermediate immobilizing plate, with the transverse passage opening out whose dimension in the frontal direction is less than a corresponding passage spacing between a front end and a rear end of the V-shaped bottom.

According to an implementation, the intermediate immobilizing plate has a T-shape perpendicular to the elevation direction and comprises at least two V-shaped lateral openings, on opposite sides transversely of the profiled rigid guide and opening out to a front transverse surface of the T-shaped intermediate immobilizing plate.

According to an implementation, at least one intermediate threading plate and one intermediate immobilizing plate comprise a U-shaped jig including a lower base and rigidly attached to an upper surface of the corresponding intermediate plate and whose two parallel branches extend in the elevation direction and are separated from each other in the transverse direction, whereas the profiled rigid guide comprises away from both and from the U-shaped jig, at least two elastically deformable loops for attaching a fishing accessory forming prismatic box onto the carrying system.

According to an implementation, the carrying system comprises an intermediate tip confinement plate provided with two lateral tip protection throats and one central tip protection throat located between the two lateral tip protection throats and opening out to a transverse front surface of the intermediate tip confinement plate, where the lateral tip protection throats are inscribed in a circular profile and the central tip protection throat is inscribed in a profile elongated in the frontal direction from the front surface of the intermediate tip confinement plate and defining a convex biplanar bottom towards the front of this central tip protection throat.

According to an implementation, at least one of the lower, middle and upper adjustable arrangements for elevation adjustment comprise a support body for the corresponding intermediate plate and a cam and knob mounting where the cam is by default in a sliding hold with the profiled concave track and where the knob by screwing presses together under pressure and immobilizes the mounting relative to the profiled concave track in an immobilized position along the profiled concave track between the base and summit elevation ends.

According to an implementation, the carrying system comprises on a rear surface of the profiled rigid guide and removable attachment structures for a frame for holding to the ground, where this frame for holding to the ground comprises at least:
 a central elevation column;
 a transverse arm substantially at the level of the summit elevation end at the summit of the central elevation column;
 two movable and extendable props, mounted on ball-and-socket joints at lateral ends at the transverse arm; and
 two hollow notched hangers, rigidly mounted at one upper end and transversely on either side of the central elevation column.

Another object of the invention is a stake suited for being mounted on the carrying system described.

According to an implementation, the stake has at an upper end of the leg thereof a horseshoe collar, open on the opposite side in the frontal direction and provided with a projecting cylindrical finger on the outer periphery thereof and in the transverse direction. The stake also has at a middle location in elevation on the leg thereof a circular collar defining a closed passage which is across from a space for stake passage inside the open horseshoe collar; the cylindrical projection finger is complementary to a complementary guide track of a fishing accessory forming prismatic box; and, the stake and this prismatic box can be integrated with the carrying system.

Another objective of the invention is a method for attaching a fishing rod or "surf casting" stake onto a carrying system such as described.

According to this method, the rod or stake is slid along an approach angle through one of the through holes of the intermediate threading plate and then a lower base of this rod is received in one of the corresponding base receiving housings of the intermediate base plate and the rod is adjusted parallel to the elevation direction for being lodged into one of the corresponding flexible clip mechanisms of the intermediate immobilizing plate, whereas an upper end of this rod is received in one of the two corresponding lateral throats of the intermediate tip confinement plate.

BRIEF DESCRIPTION OF THE SEVERAL VIEWS OF THE DRAWINGS

The invention and the advantages thereof will appear with greater precision in the following detailed description of examples given solely for illustration with reference to the attached figures in which.

DETAILED DESCRIPTION OF THE INVENTION

In the following detailed description of examples of the invention, note on FIGS. 1 to 12 three mutually perpendicular directions, X, Y and Z, forming an orthogonal reference frame.

The X direction represents the transverse axis of the structures shown whereas another direction, Y, represents the frontal axis. The transverse direction X laterally defines (right/left) the structures and is considered parallel to the ground notwithstanding the actual position of the structures.

The frontal direction Y is oriented perpendicularly to the transverse direction X and defines depths (front/rear) of the structures. The frontal direction Y is therefore also parallel to the ground notwithstanding the actual position of the structures.

A third direction Z (perpendicular to X and Y) is referred to as elevation and corresponds to heights or to elevation dimensions and positions (upper, summit, tip versus lower, bottom, base) of the structures shown.

In FIGS. 1 to 15, the reference 1 designates a carrying system for recreational fishing. As shown on FIG. 1, the system 1 aims to carry at least one fishing rod 2 and/or one stake 3 for holding or "surf casting" and/or one container or box 40 forming an accessory 4 for fishing. Here, the system 1 carries two rods 2, three stakes 3 and two boxes 40. Other implementations can carry two, three or four rods/stakes.

In the figures, this carrying system 1 comprises in particular:
  a profiled rigid guide 6 with a front surface 6A;
  a base sole 5; and,
  a plurality of intermediate plates, here four in number, as shown by 10, 15, 18 and 25.

In the implementations shown, the profiled rigid guide 6 is a metal profiled segment with rectangular section in a transverse and frontal plane.

Figure 1:
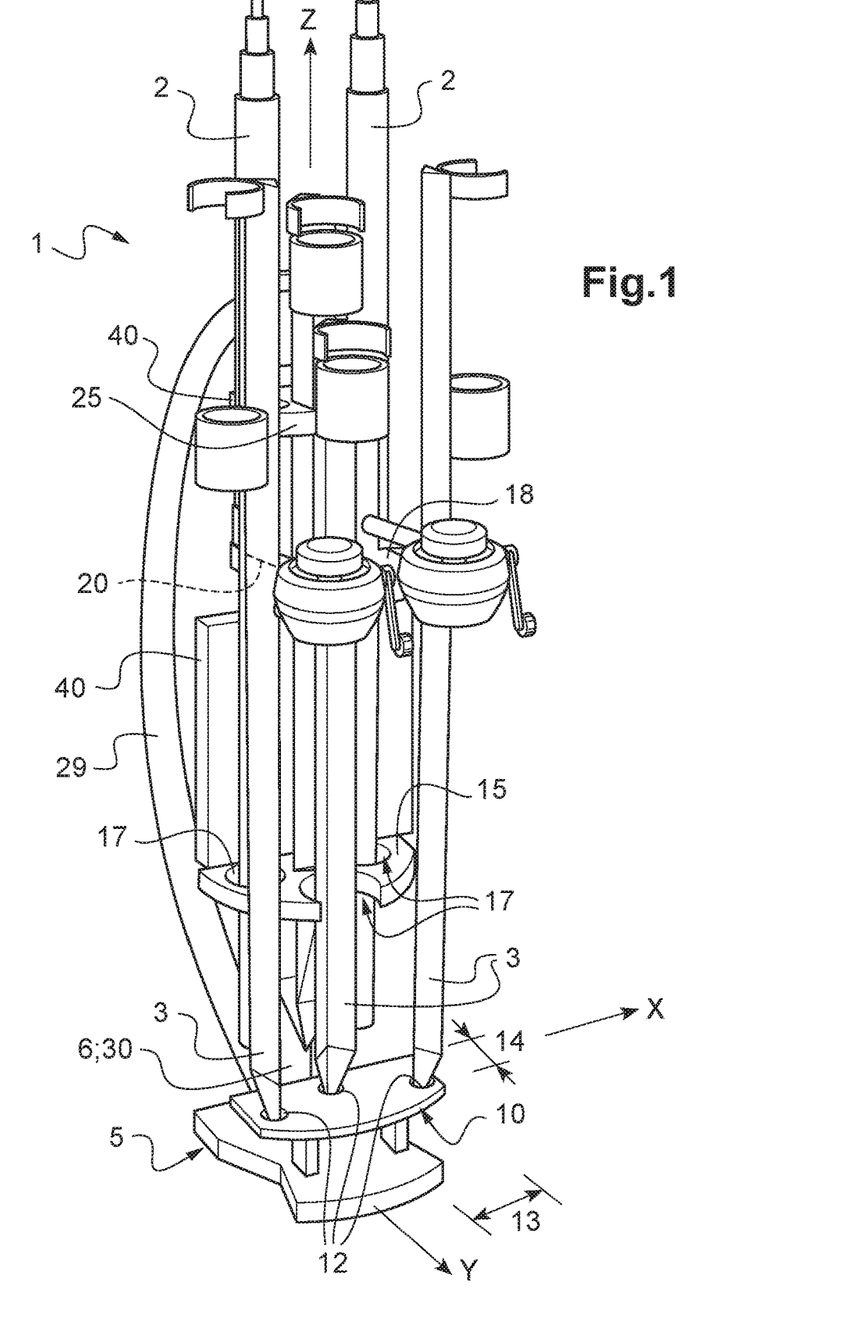
FIG. 1 is an overall perspective view of an implementation of the carrying system according to the invention in upright position on the feet of a base sole, with two rods, three non-telescopic stakes and also two prismatic accessory boxes which are held rigidly connected on to the system and immobilized thereby. Flexible transport structures in strap form are attached to the back of the system for carrying thereof.

In the implementation from FIG. 1, it involves a profiled rigid guide 6 of aluminum or steel whose front surface 6A or width measures from 30 mm to 70 mm in the transverse direction Y, whereas the frontal sides thereof measure from 10 mm to 40 mm in the frontal direction X. In the elevation direction, the profiled rigid guide 6 measures from 700 mm to 1200 mm depending on the implementations. This profiled rigid guide 6 also comprises a rear surface 30.

Figures 2, 3:
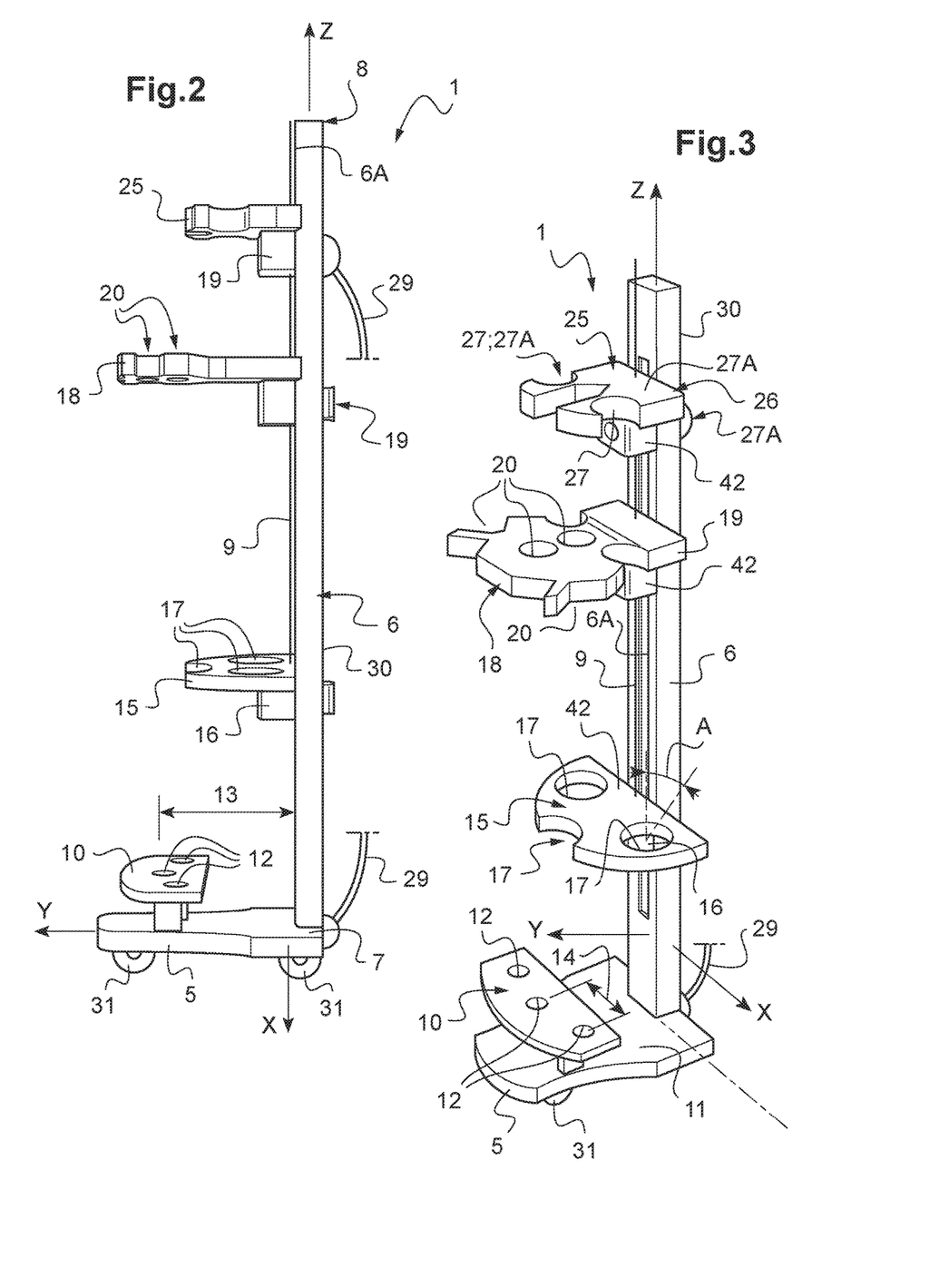
FIG. 2 is an overall frontal elevation view of an implementation of the carrying system according to the invention shown bare and in upright position with, from bottom to top, a sole with feet and casters, a base plate, a threading plate, an immobilizing plate and a confinement plate, where these plates are each mounted along a profiled rigid guide.
FIG. 3 is an overall transverse elevation perspective view of the bare carrying system, which is similar to that of FIG. 2, with an immobilizing plate with elastic hooking clip in the frontally extended connection area.

The sole 5 and the intermediate plates 10, 15, 18 and 25 here all extend in-depth and transversely on a single side of the guide 6 from the front surface 6A. In FIGS. 1 and 2, for example, the system 1 has from bottom to top: the sole 5 and then the plates 10, 15, 18 and 25.

This sole 5 and the plates 10, 15, 18 and 25 are distributed in the elevation direction Z of the system 1. Because of that, the rear surface 30—which is opposite the front surface 6A relative to a median transverse-elevation plane of the guide 6—is free of any rigid component for mounting rods 2, stakes 3, boxes 40 and therefore clearly projects. In other words, the sole 5 and the plates 10, 15, 18 and 25 are disposed forward on the same front side of the guide 6 from the front surface 6A of this system 1 in that way freeing the back surface 30 of any encumbering structure.

The profiled rigid guide 6 mainly extends in the elevation direction Z of the carrying system 1 and comprises one base elevation end 7 and one summit elevation end 8. This guide 6 additionally comprises a profiled concave track 9 between these elevation extremities 7 and 8. In the implementations, a profiled concave track 9 extends over more than three-quarters to nine-tenths of the distance in elevation (Z) separating these ends 7 and 8.

Depending on the implementations, the track has a dimension of the order of 0.5 to 0.9 times that of the guide 6 in the elevation direction Z. For example, for a 1000 mm guide, the track 9 measures 750 mm in the elevation direction Z.

The base sole 5 extends perpendicularly to the elevation direction Z from the base elevation end 7 and is rigidly attached to the profiled rigid guide 6 from which it projects from the front surface 6A. In the implementations shown, the sole 5 is removably but not adjustably attached to the end of the guide 6. The base sole 5 therefore forms the base end of the system 1. In other implementations, the sole 5 is adjustable.

In FIG. 1, the sole 5 has a "Ω" shaped contour in a plane perpendicular to the elevation direction Z. From front to back this sole 5 with a "Ω" shaped contour has a front pavilion first rounded then narrowing towards the rear, a flared middle segment to form two lateral edges in laterally external caliper arms continuously from the front pavilion, and a rear segment with rectangular contours which is attached to the guide 6.

In FIG. 1, the plate 10 is mounted on the sole 5 in line with the junction of the laterally external caliper and the middle section. The plate 10 is here mounted on the sole 5 by means of lifting spacers, frontally away from the guide 6.

In FIG. 2, each intermediate plate 10, 15, 18 and 25 is planar and extends perpendicularly to the elevation direction Z. Unlike the plate 10, which is mounted at a location with fixed elevation, each other plate 15, 18 and 25 is rigidly attached, but adjustably in elevation and removably, onto the profiled rigid guide 6 from which it projects from the front surface 6A.

In this implementation, apart from the plate 10 which is not adjustable in height, the position of each intermediate plate 15, 18 and 25, apart from the base plate 10, can be adjusted in this elevation direction Z along the track 9 between the base 5 and the summit elevation end 8. Although rigidly attached to the guide 6 once the position thereof is chosen, each intermediate plate 10, 15, 18 and 25 is mounted detachably within the system 1.

FIG. 2 shows the system 1 which comprises:
an intermediate threading plate 15;
an intermediate immobilizing plate 18; and
an intermediate tip confinement plate 25.

In the implementations shown, although this is optional, the system 1 furthermore comprises an intermediate base plate 10. All the implementations of system 1 comprise at least one intermediate threading plate 15 and one intermediate immobilizing plate 18, but depending on the needs and models, some systems 1 do not have an intermediate base plate 10 and/or intermediate tip confinement plate 25.

Note that each intermediate plate 10, 15, 18 and 25 has in the elevation direction Z a thickness which is of the order of 5 mm to 40 mm, for example 8 mm to 15 mm, meaning substantially greater than the usual transverse section (diameter/width) of a rod 2 or stake 3. Compared to plates 10, 18 and 25, the intermediate threading plate 15 from FIG. 2 appears to be distinctly less thick in elevation (Z). This is intended to simplify the threading (see FIG. 5 for example).

In the implementation shown, the system 1 comprises an intermediate base plate 10, which is rigidly attached onto an upper surface 11 of the sole 5. In line with this upper surface 11, visible in FIG. 3, the intermediate base plate 10 comprises at least two base receiving housings 12.

In FIG. 2, each receiving housing 12 is circular and has a typical transverse section (diameter/width) for a stake tip 3 (which is mounted here, point downward) or a rod base 2 (which would then be mounted point upward).

Depending on the implementations, each housing 12 serves to receive and protect such a stake tip 3 or rod base 2. For the three stakes 3, the housings 12 from FIG. 2 serve as lower stop for positioning in elevation. It is similar for some systems 1 where the lower end of rods 2 enter into these housings 12.

In FIG. 2, each receiving housing 12 is at a set location 13 in the frontal direction Y and a set location 14 (FIG. 3) in the transverse direction X.

Two receiving housings 12 are arranged laterally on either side of the profiled concave track 9 in the transverse direction X. A third central housing 12 is arranged frontally opposite and in front of this track 9 and therefore of the guide 6.

Some implementations of this plate 10 are of injected plastic, machined/cut material (among them: wood, synthetics, metal, composites, etc.), or result from molding.

As for the threading plate 15 from FIG. 2, it is rigidly attached onto the profiled concave track 9 by lower adjustable arrangement 16. With this arrangement 16, the position in elevation (Z) of the plate 15 can be adjusted.

In this implementation, the plate 15 is dedicated in particular to the through passage of two rods 2 frontally recessed towards the rear from the two lateral housings 12 of the plate 10. But this plate 15 leaves clearance for a stake 3 intended to have the tip thereof in the central housing 12 of the plate 10. This makes the system 1 frontally more compact, by allowing bringing the housings 12 and this clearance closer to the guide 6.

According to the invention, the intermediate threading plate 15 is provided with at least 2 through holes 17. In FIG. 2, two of the three holes 17 are intended to receive rods 2 and the third simply serves to support and surround a stake 2. This plate 15 therefore comprises three holes 17, where the one in the center forms the clearance and is located in line with the central housing 12. It will be seen later that in some implementations the central threading plate 15 comprises other types of holes 17.

In FIG. 3, the intermediate immobilizing plate 15 has a semicircular shape apart from the cut-out in front of the hole 17 forming the front clearance, in a plane perpendicular to the Z direction. In this Z direction, the thickness thereof is for example of the order of 10 mm to 30 mm, for example 15 mm. Some implementations of this plate 15 are of injected plastic, machined/cut material (among them: wood, synthetics, metal, composites, etc.), or result from molding.

It is understood that in this implementation, the three holes 17 are disposed offset towards the rear relative to the housings 12. In that way, when in position on this system 1, the three stakes 3 come against the periphery or outer contour of the intermediate immobilizing plate 15 in order to surround the two rods 2 which are received inside the two other holes 17. These two other holes 17 are aligned in the transverse direction X and located one on each side of the track 9.

In the implementation from FIG. 3, the intermediate immobilizing plate 18 is mounted adjustably on the track 9 of the guide 6 by a middle adjustable arrangement 19. This arrangement 19 provides the attachment and also the possibility of choosing the position in elevation (Z direction) of the plate 18.

In FIG. 3, the intermediate immobilizing plate 18 is provided with at least two openings 20. In fact, the plate 18 comprises four openings 20: two central, and two lateral and opening out. The lateral openings 20 are each arranged respectively facing and in line with a closed hole 17 and are offset relative to the hole 17 forming the front clearance space. These lateral openings 20 are therefore dedicated to receiving rods 2. As for the central openings 20, they are closed and aligned in the frontal direction Y. The axes of all the openings 20 extend in the elevation direction Z.

The axis of each lateral opening 20 extends in the elevation direction Z. The two lateral openings 20 are respectively arranged in a transverse end part 21 of the plate 18 and each have a deformable elastic clip mechanism 22 for immobilizing a rod on the system 1 by a final movement upright.

Each elastically deformable clip mechanism 22 has a transverse opening passage 23 which opens to the outside of the plate 18 in the transverse direction X.

The immobilizing plate 18 has at least 2 upper support ranges 24, each in the periphery of a lateral opening 20, on both sides of the central openings 20. These upper support ranges 24 serve to receive and immobilize in height (Z) the reels of rods 2 mounted in these lateral openings 20. In this way, these rods 2 can have the base thereof away from the plate 15 when they are placed on the system 1.

In FIG. 3, the two lateral openings 20 each respectively offset from the base receiving housings 12 but facing and in line with a corresponding through hole 17.

According to the implementation from FIG. 3 it can be seen that the carrying system 1 includes an intermediate tip confinement plate 25 which is rigidly attached onto the profiled concave track 9 by an upper adjustable arrangement 26. With this upper adjustable arrangement 26, the position of the plate 25 can be adjusted in elevation (Z).

This intermediate plate 25 is provided with at least 2 lateral throats 27 for protection of the tips of the rods 2/stakes 3, for example. Each lateral throat 27 is respectively opposite an opening 20 of the plate 18 and therefore the housings 12 and holes 17 of the other plates 10 and 15. The axis of each lateral throat 27 extends in the elevation direction Z and is respectively arranged on a transverse side 27A (FIG. 3) of the plate 25. These throats 27 each form an arched receptacle opening towards the outside of the carrying system 1 in the X direction.

In FIG. 3, the lateral throats 27 have a generally cylindrical with circular base profile, just like the central openings 20 of the plate 18, the holes 17 of the plate 15, and the housings 12 of the plate 10.

According to the invention, the throats 27, openings 20, holes 17 and housings 12 all extend in-depth and transversely on just one side of the guide 5 from the front surface 6A thereof and extend transversely and frontally in the X and Y directions of the system 1. In other words, the throats 27, openings 20, holes 17 and housings 12 are disposed on the same front side of the system 1 in that way leaving the rear surface 30 free.

It will be seen later that the mutual diameters and dispositions of the throats 27, openings 20, holes 17 and housings 12 are predetermined to provide rapid mounting functions for the rods 2/stakes 3 and also for rigidly tightening these rods 2/stakes 3 to the system 1. In fact, the invention serves to apply precalculated pressure and friction, but also relative rigidity, to the stakes 3/rods 2 in order to immobilize them into the positions thereof on the system 1.

According to the implementation in FIG. 2, the system 1 and more precisely the guide 6 comprises on the rear surface 30, frontally opposite the front surface 6A, carrying structures in the form of at least one carrying strap 29. This carrying strap 29 serves as a flexible human carrying structure and is rigidly connected both to the base sole 5 and also to the upper adjustable arrangement 26 of the plate 25. In some implementations, the strap is rigidly connected with the middle arrangement 19 of the plate 18. The carrying strap 29 is thus made rigidly connected by attachment to the sole 5 and to one of the middle 19 or adjustable 26 arrangements on this rear surface 30 of the profiled rigid guide 6, meaning opposite the intermediate plates 10, 15, 18 and 25 in the frontal direction Y.

According to the implementations of FIGS. 1 to 3, the base sole 5 comprises on a lower surface, meaning opposite in elevation from the upper surface 11 of the plate 10, at least three feet 31 which are projecting towards the outside of the system 1 in the elevation direction Z. These feet 31 serve, on firm ground in particular, to hold the system 1 in raised position (with the guide 6 substantially perpendicular to the ground), which is especially practical, in particular for the attachment/removal of rods 2/stakes 3/boxes 40 as explained later. According to the implementations, the system 1 has three or four feet 31, for example. In the implementations from FIG. 2, at least two feet 31 comprise casters, i.e., wheels, for example in line with the rear surface 6A.

In FIG. 3 the intermediate base plate 10 comprises three base receiving housings 12, disposed in a triangle whose base is parallel to the transverse direction X and whose point—opposite the base in the frontal direction Y—defines a central receiving housing 12 in front of the base and opposite the guide 6 in the frontal direction Y. In other words, the two housings 12 for the base are aligned on the transverse direction X and the central housing 12 is frontally in front of these two base housings 12, opposite the guide 6.

Still in FIG. 3, the intermediate threading plate 15 comprises here three through holes 17, disposed on plate 15 in a triangle whose base is parallel with the transverse direction X.

It should however be noted that the three through holes 17 have an outer contour, here a diameter, which is distinctly larger than that of the housings 12. For example, the through holes 17 have a maximum dimension (e.g. diameter) of the order of 25 to 75 mm, whereas the housings 12 have a maximum dimension (e.g. diameter) of the order of 10 to 25 mm. For example, the maximum dimension of the through holes 17 is at least twice the maximum dimension of the housings 12.

Figure 4:
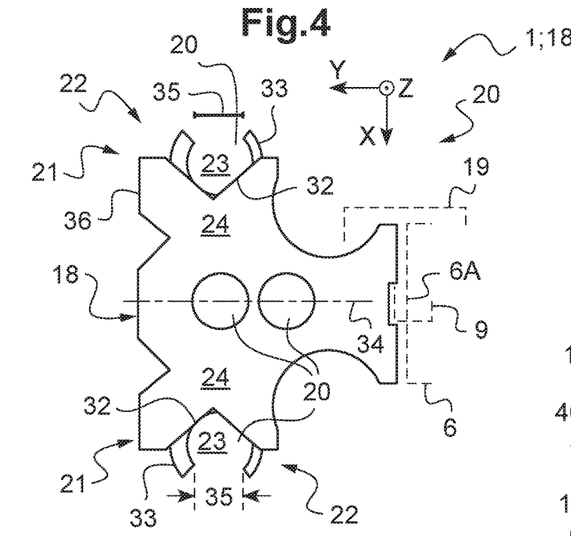
FIG. 4 is a frontal and transverse plane view of an implementation according to the invention of immobilizing plate with elastic hooking clip for rods/stakes, with this plate has a frontally compact connection area.

In FIG. 4, the intermediate immobilizing plate 18 has an "T" shape perpendicularly to the elevation direction Z. Here, this plate 18 comprises at least 4 lateral openings 20. Two of these lateral openings 20 each have an elastically deformable clip mechanism 22 and a transverse passage 23 opening out transversely towards the outside. Two other lateral openings 20, these ones central, are aligned in the frontal direction Y from the track 9 and transversely in the middle of the guide 6. These other lateral openings 20 are aligned transversely away from the guide 6 with a front central opening 20 which is arranged between the clip mechanisms 22 and the transverse passages 23 such that these mechanisms 22, passages 23, and front central openings 20 are aligned with each other so as to coincide in the elevation direction Z.

In FIG. 4, the mechanisms 22 are distinct members from the plate 18 and added thereto. In this example, each mechanism 22 is formed of an open arc and is made of an elastically deformable material, such as PVC, polyurethane or other polymer foam. Each mechanism 22 is housed and retained in a groove of complementary shape and attached to the plate 18 for example by mechanical bonding, screwing or fastening.

According to an implementation, each elastically deformable clip mechanism 22 comprises a bottom 32. This bottom 32 is "V" shaped and jointly molded with the plate 18. Two tabs 33 shaped like elastically deformable hooks each project towards the outside of the plate 18 each opposite the other in a frontal and transverse median plane 34 of the plate 18. Compared to each pair of tabs 33 the corresponding passage 23 has a dimension in the frontal direction Y which is less than a separation of corresponding passage 35 between a front end and a rear end of the "V" shaped bottom.

Figure 13:
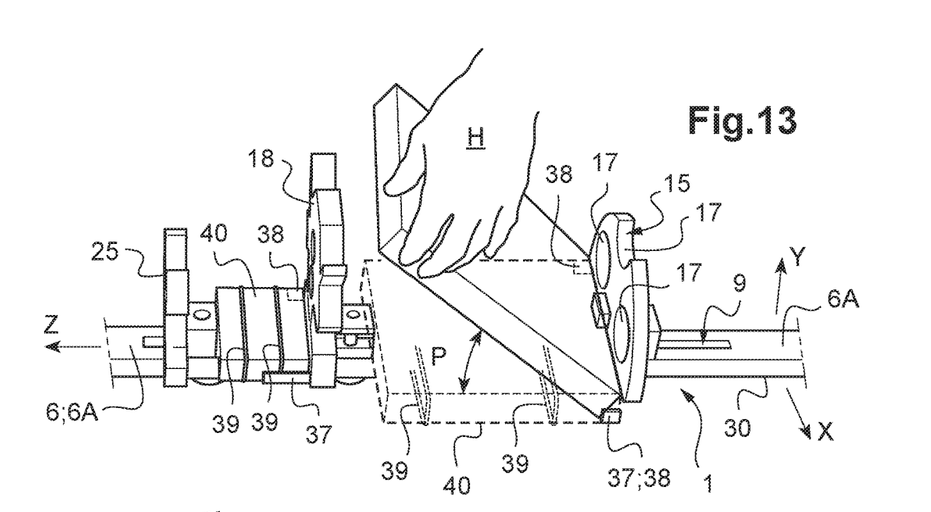
FIG. 13 is a partial frontal and transverse perspective view which shows the mounting/removal on the carrying system according to the invention of an accessory forming prismatic box, with another box already attached and retained by elastic connections.

For the mounting of boxes 40, the implementation from Figure shows that the intermediate threading plate 15 and/or the intermediate immobilizing plate comprise a jig 37. This jig 37 is U-shaped; one lower base is rigidly attached to an upper surface of the corresponding intermediate plate (15, 18). Each U-shaped jig 37 has two parallel branches 38 which extend in a frontal plane in the elevation direction Z and separated from each other in the transverse direction X by a distance corresponding to the width of the box 40 which itself is intended to be positioned transversely.

For the frontal positioning of each box 40, the front surface 6A of the guide 6 serves as a stop in the Y direction. This profiled rigid guide 6 comprises away from each other and from the U-shaped jig at least two elastically deformable loops 39 for attaching a fishing accessory forming prismatic box 40 onto the carrying system 1.

Figures 14, 15:
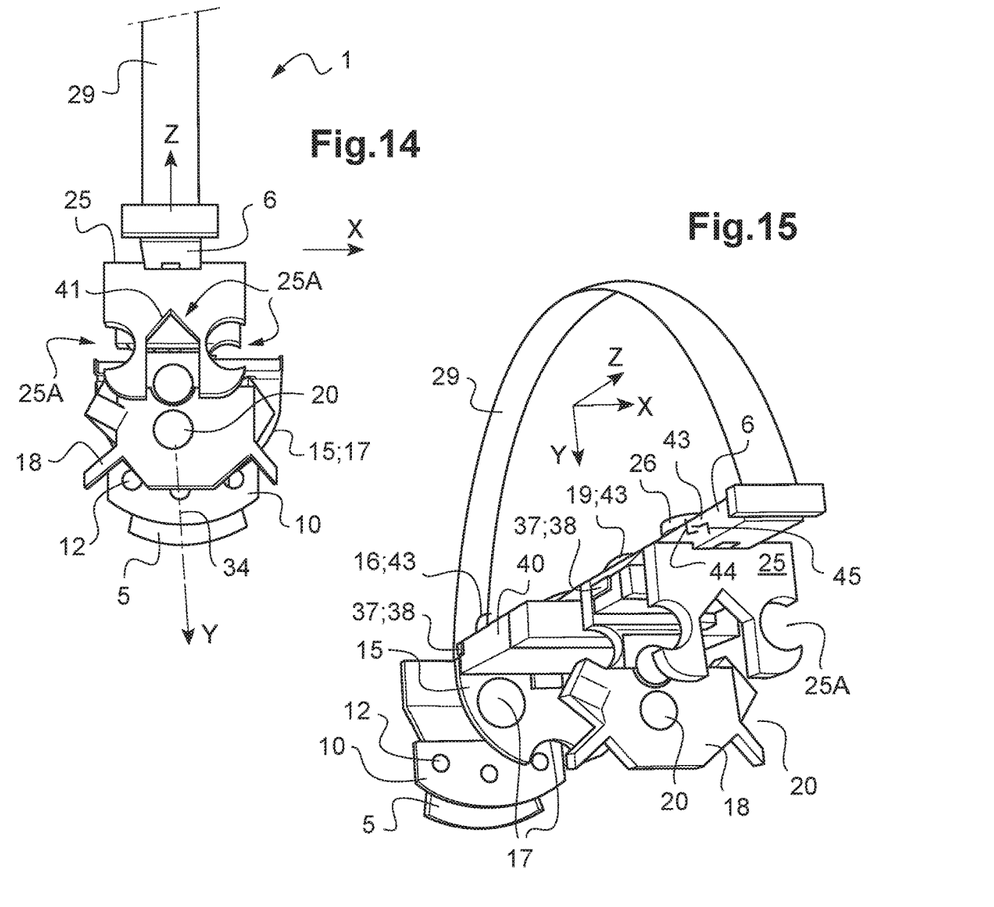
FIG. 14 is a top elevation view in plunging perspective from a frontally foreword position of a carrying system according to the invention which shows the serial coincidence in elevation of housings and/or holes and/or openings and/or passages in order to provide positions for mounting and attachment of rods and/or stakes onto the system.
FIG. 15 is a lateral top perspective view of a carrying system according to the invention with housings and/or holes and/or openings and/or passages in serial coincidence in elevation alignment.

Above the boxes 40, according to the implementation from FIG. 14, the intermediate tip confinement plate 25 of the carrying system 1 is provided with three throats 27. Two of these throats 27 are lateral and serve to protect the tips of the rods 2. Another throat 27 is central, meaning aligned on the transverse median plane 34 of the system 1. This central throat 27 also serves to protect a tip of rod 2 and is located between the two other lateral throats 27. The central throat 27 opens out to a front transverse surface of the confinement plate 25. The two lateral throats 27 are inscribed in a circular profile and the central throat 27 is inscribed in a profile elongated in the frontal direction Y, from the front surface of the plate 25. The central throat 27 defines a convex biplanar bottom 41 for receiving a stake base 3 and is open towards the front of the plate 25, allowing access from the front of the system 1.

Referring to FIG. 14, it is understood that depending on the implementations some housings 12, holes 17, openings 20 and throats 27 coincide and are coaxial in the elevation direction Z, whereas other housings 12, holes 17, openings 20 and throats 27 are offset with respect to each other. In this FIG. 14, it can be seen that for three stakes 3, the three housings 12 coincide with a single central hole 17, no opening 20, and three throats 27. For the rods 2, two lateral holes 17 coincide with two lateral openings 20 and two throats 27. This makes the locations for mounting and attaching rods and/or stakes onto the system 1 more compact.

Now referring to FIG. 15, we explain an implementation for adjustment in elevation position of plates 15, 18 and 25. Here, each of the lower 16, middle 19 and upper 26 adjustable arrangements comprises a support body 42 (FIG. 3) which supports the corresponding plate.

Each arrangement (16, 19, 26) from FIG. 15 furthermore has a cam and knob mounting 43 in which the cam 44 is trapped sliding by default with the track 9 and for which the knob 45 by screwing presses together under pressure and immobilizes the mounting 43 against the track 9 in a desired immobilized position along the track 9. In this way, this position can be chosen and adjusted between the base 7 and summit 8 elevation ends.

Figures 8, 9, 10:
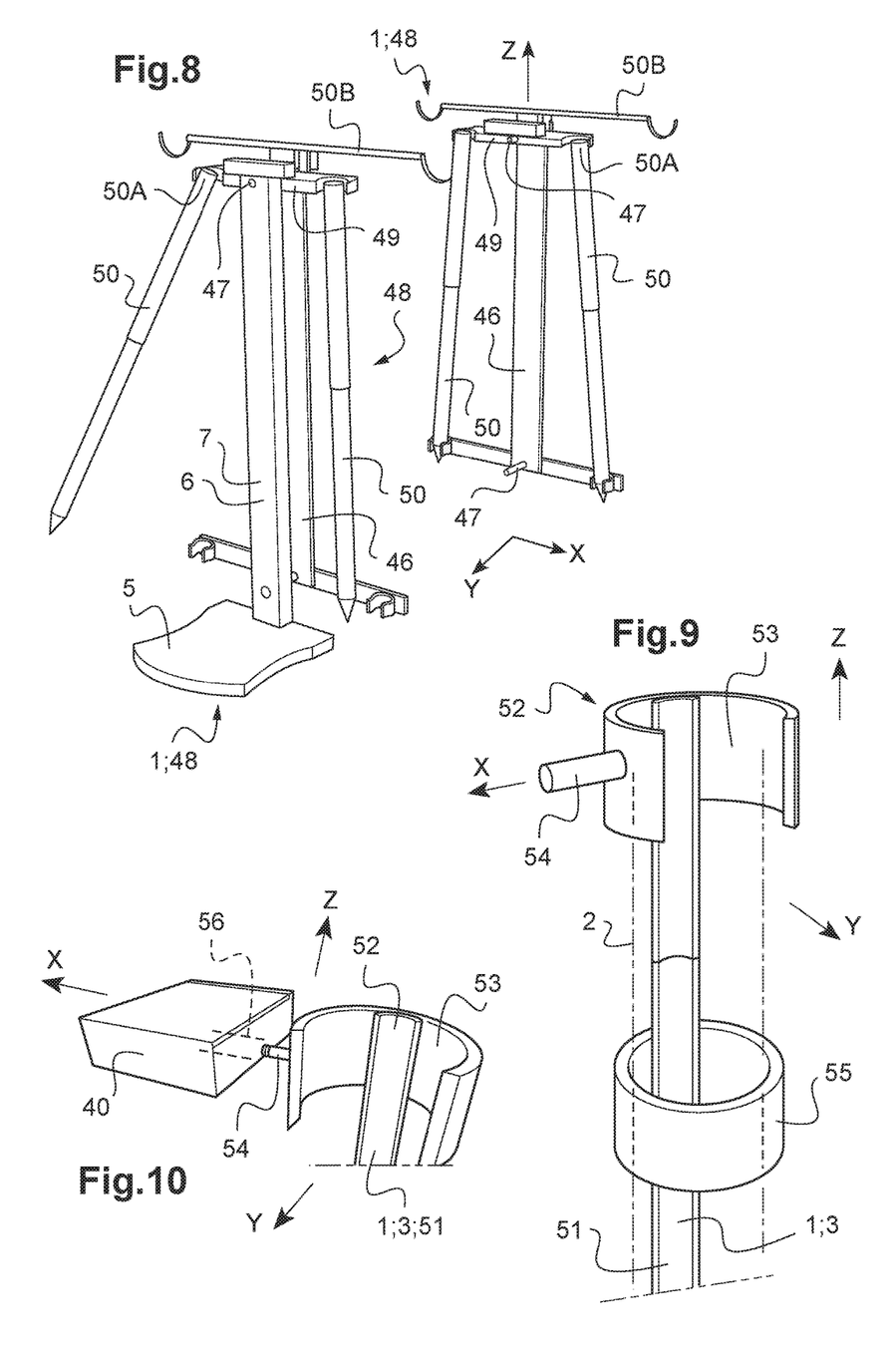
FIG. 8 is an uncluttered perspective view of a frame for holding the carrying system according to the invention on the ground, where hollow notched hangers project transversely from a central elevation column of this frame; on the left the central elevation column of the frame is attached to the guide of the system and movable props are extended and inclined transversely and/or frontally. On the right, the frame alone is detached from the rest of the system and the props are retracted and folded back against the central elevation column.
FIG. 9 is a partial perspective view of a stake from the carrying system according to the invention, suited to be incorporated in the system and having a horseshoe collar and a cylindrical finger for mounting a box.
FIG. 10 is a view similar to FIG. 9 where a box is mounted on the cylindrical finger of the horseshoe collar of the stake.

Now referring to FIG. 8 according to an implementation, the system 1 comprises rigid and removable attachment structures 47. These structures 47 serve to assemble a frame for holding to the ground 48 on the rear surface 30 of the guide 6.

Figures 11, 12:
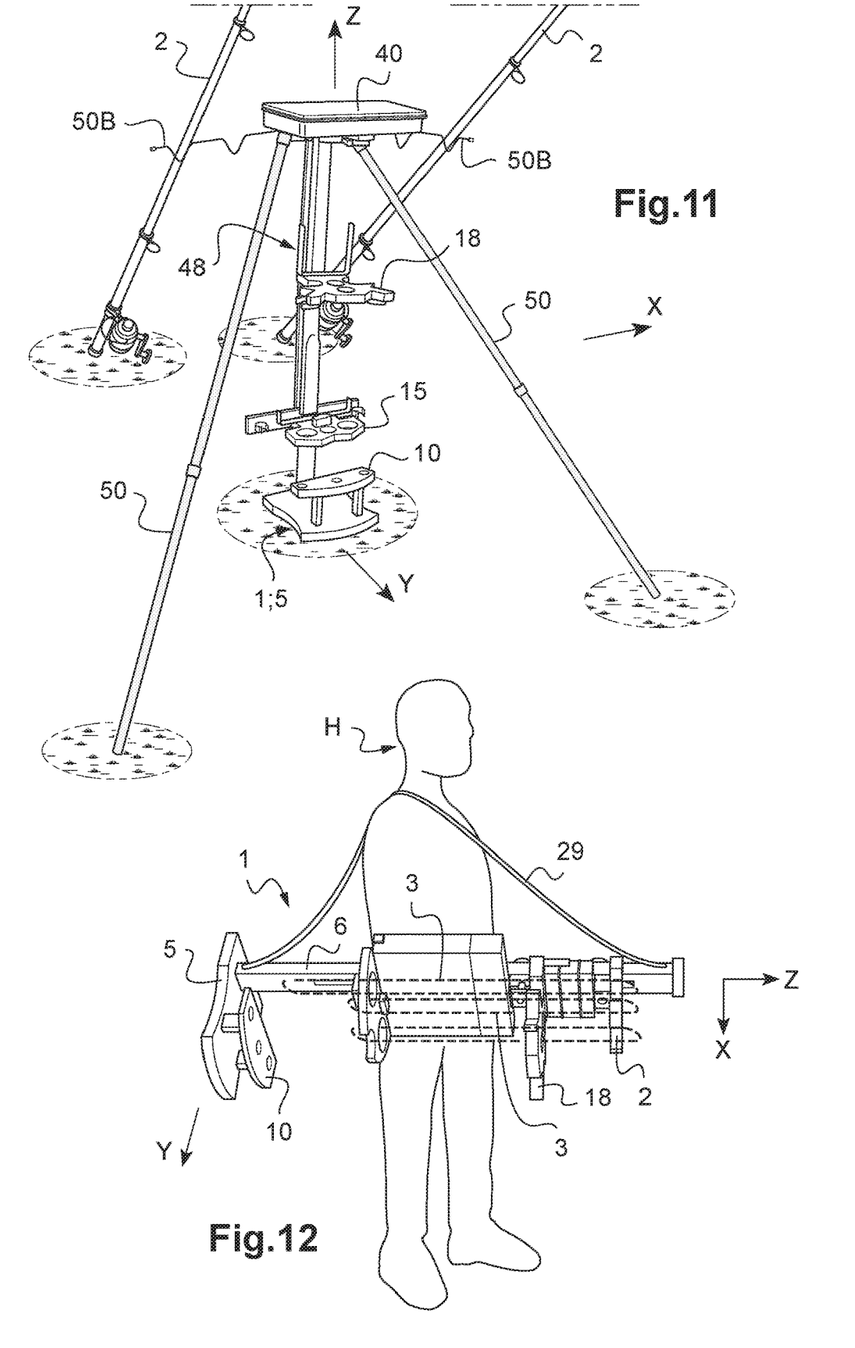
FIG. 11 is a perspective view on the ground of a carrying system according to the invention with a frame for holding to the ground where the props are extended forward and transversely and 2 fishing rods rest on one hollow notch each of a hangar projecting transversely.
FIG. 12 is a perspective view of the system according to the invention, carried by a bandolier, like a sport or golf bag, by a human user using a strap connected to the guide with rods, stakes and box attached.

The right part of FIG. 8 shows this frame 48 separated from the remainder of system 1. This frame 48 provides for holding the rods to the ground as shown in FIG. 11 when it is separated from the remainder of the system 1. In contrast, the frame 48 can be integrated—see left part of FIG. 8—on the rear surface 30 of the profiled rigid guide 6, in particular for transport.

In FIG. 8, this frame for holding to the ground 48 comprises at least:
- a central elevation column 46;
- a transverse arm 49 substantially at the level of the summit elevation end 8 and at the summit of the column 46;
- two props 50 which are movable and extendable, where these movable and extendable props 50 are mounted on ball-and-socket joints 50A at the lateral ends of the transverse arm 49; and
- two hollow notched hangers 50B, rigidly mounted at one upper end and transversely on either side of the central elevation column 46.

FIG. 8 clearly shows this frame 48 for holding the system 1 to the ground according to the invention, with the two hangers 50B thereof where the hollow notches serve to receive and support rods 2 laterally on either side of the central elevation column 46. On the left, this column 46 is attached to the guide 6 and the movable props 50 are shown one (on the left) in operating position meaning being transversely and frontally inclined, whereas the other (on the right) is still in folded position against the column 46 and therefore directed in elevation (Z).

On the right in FIG. 8, the frame 48 is shown alone and therefore detached from the remainder of the system 1. The two props 50 thereof are retracted and folded in elevation (Z) against the column 46.

To illustrate a practical example of use of this frame 48, FIG. 11 is a perspective view on the ground of the system 1 according to the invention, with the frame 48 thereof holding to the ground two rods 2 because of the two props 50 thereof extended forward and transversely in order to stabilize these two rods 2 each resting on a hollow notch of the hanger 50B projecting transversely, while the base of the two rods 2 rest on the ground behind the system 1.

Another objective of the invention is a stake 3 such as shown in FIG. 9 which is disposed for being mounted on the carrying system 1. This stake 3 from FIG. 9 conventionally comprises a leg 51 with an upper end 52. At this end 52, the leg 3 has a collar 53 defining an open passage for engaging the rod 2. Additionally, away towards the bottom in elevation (Z), the stake 3 comprises a closed passage 55, in which the rod 2 must be threaded from top to bottom, in order to be held on this stake 3.

As FIG. 9 shows, with this stake 3 a rod 2 (in dotted lines) can be lodged in the collar 53 and then in the closed passage 55. According to this implementation, the collar 53 is horseshoe-shaped, open across from the leg 51 in the frontal direction Y and provided, on the outer periphery and along the transverse direction X, with a cylindrical finger 54 projecting diagonally from the collar 53.

This collar 53 is generally circular and attached to one end in elevation, referred to as upper, of the leg 51. The same goes for the closed passage 55. Across from the leg 51, the collar 53 has on the front a space for passage of the rod 2 to the inside of this collar 53 for mounting thereof.

As FIG. 10 shows, because of the finger 54, a box 40 can be attached onto the stake 3 in a practical position where the content of this box 40 is easily accessible. For this purpose, the finger 54 is arranged projecting transversely from the collar 53. The shape of this finger 54 is cylindrical and complementary to that of a complementary guide track 56 inside of the box 40. This box 40 can in that way be attached onto the stake, at a height practical for the human user H, who in that way can have their fishing accessories available at the top of the stake 3 and in this box 40. Obviously, such a stake 3 with finger 54 for attachment of box 40 can be integrated into the carrying system 1, in particular for carrying and transport.

Figure 5:
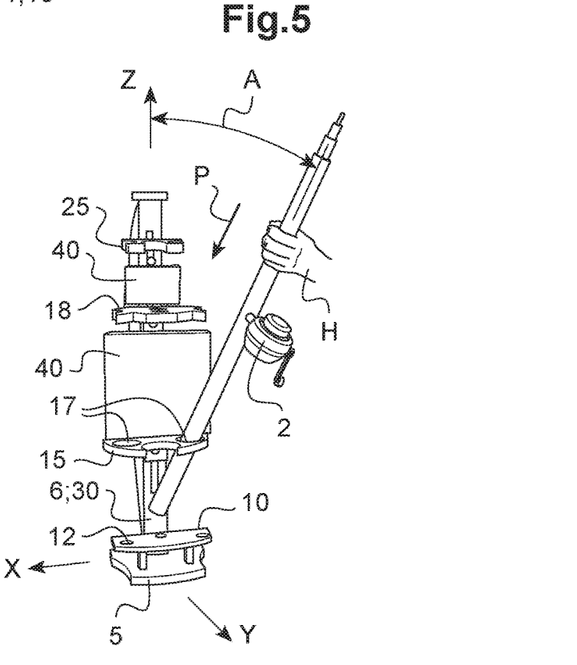
FIG. 5 is a perspective overall view showing a step of inclined—transversely and/or frontally—insertion of a rod into a through hole of an intermediate threading plate according to the invention.
Figure 6:
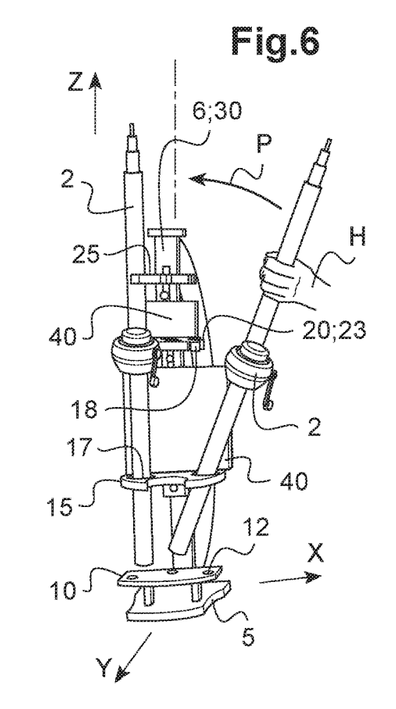
FIG. 6 is a perspective overall view showing a step of moving an upper rod tip transversely and/or frontally upright and towards a transverse passage opening out of an intermediate immobilizing plate of the carrying system according to the invention.
Figure 7:
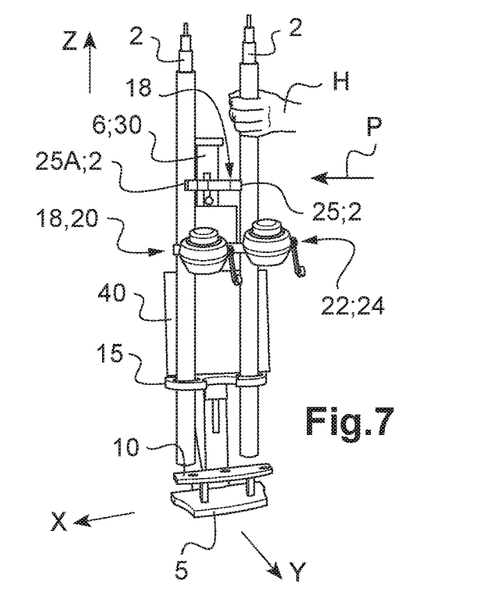
FIG. 7 is an overall perspective view showing an immobilizing step by final movement upright and transversely pressing into a deformable clip mechanism of another rod in the carrying system from FIGS. 6 and 7.

Now, referring to FIGS. 5 to 7 in particular, an attaching method P according to the invention is disclosed. Using this method P, at least one fishing rod 2 and/or at least one "surf casting" stake 3 can be mounted on a carrying system 1 as described. This method P also comprises the mounting of a box 40 within a system 1 such as shown in FIG. 13.

According to this method P, the rod 2 or stake 3 is slid by the human user H through one of the holes 17 of the intermediate threading plate 15 as shown by the downward arrow in FIG. 5. This sliding step is done along an approach angle A. Compared to the elevation direction Z, this approach angle A is inclined downward both towards the outside transversely and towards the front frontally.

Then, according to a subsequent step of the method P, a lower base of the rod 2 is received in a corresponding housing 20 of the intermediate base plate 18 as shown by the arrow on FIG. 6. In fact, the rod 2 is placed with the body thereof against the passage 23 of the mechanism 22 without entering into it at this step of receiving.

Next, in a step of housing and attachment shown by the arrow (from right to left) in FIG. 7, the method P provides that the rod 2 is brought fully upright parallel to the elevation direction Z, in order to be housed by forcing the passage 23 and entering into the corresponding flexible clip of the mechanism 22 of the intermediate immobilizing plate 18.

Then, in FIG. 7, this rod 2 is received in one of the lateral openings 20 of this plate 18. Additionally, one upper end of this rod 2 is lodged in one of the corresponding throats 25A or 27 of plate 25 to finalize the anchoring of the rod 2 within the system 1. In that way, the end or tip of this rod 2 is protected by the lateral throat 27 or 25A of the intermediate tip confinement plate 25.

In final position, it can be seen clearly in FIG. 7 that the reels of the rods 2 rest on the ranges 24 of the plate 18, which retains them in position in elevation. As shown in FIG. 12, the system 1 keeps the rods 2, stakes 3 and boxes 40 stably and firmly grouped and protected which allows the carrying and transport by the user H.

Because of this method P, referred to as "quarter turn", a rod 2 is housed or removed in under 5 seconds because of the attachment thereof by clipping into the mechanism 22 and by friction within the throats 25A. Similarly, a stake 3 is positioned on the system 1 in the same elapsed time.

The invention is advantageous and useful for recreational fishing. The system 1 and the method P thereof form a combination of surprising simplicity by offering useful functionalities of stiffness, bulk, significant carrying capacity and modularity.

The invention is useful and advantageous for the transport of fishing equipment, because the system 1 is not only modular, but also allows the holding of rods in position for use and also making accessories available.

Because of the rigid framework thereof (sole 5, guide 6 and plates 15, 18, 25 in particular), the invention makes it possible to hold a full set of fishing equipment (rods, stakes, accessories) vertically when the system 1 is set down, unlike a flexible cover which has to be laid on the ground after having taken the rod 2 out and which then has no further usefulness.

With the invention it is also possible to easily transport a set of equipment, e.g. two telescopic rods 2 or more depending on the model, along with two or three surf casting stakes therefore and two boxes 40, for example.

With the invention it is possible to get a light and low bulk "all-in-one" assembly (system 1 and equipment) which can carry up to four surf casting stakes for example.

The invention was designed for example so that a box of accessories and also two boxes of bait could be coupled onto the structure thereof making it very practical for carrying.

When the invention is in fishing position, the box of accessories comes to be placed on the top of the guide 5 in order to be used at a normal height (e.g., 900 mm) providing an unexpected comfort for fishing and simplicity of use, and can always be positioned facing the waves. The invention can be used at the seashore, lake shore, quay or riverbank.

A "mortise-and-tenon" style attachment is applied so that the stakes and boxes can come to be secured between each other in that way providing a nearness for useful effectiveness for placing or replacing bait on a hook while also avoiding any unnecessary movement of the person fishing for "rearming" their rod.

The invention can receive an accessory made up of two telescopic props 50 for the stability thereof on the ground and two hangers in mobile arm form in order to support two rods and be able to fish "hands-free" on hard ground.

The invention has the advantage, during manipulation thereof, of not damaging the rods 2 along with the reels therefore and allowing for the transport of stakes 3. The invention protects in full safety the person fishing and others from the points of the stakes. The invention provides unexpected safety and because of the simplicity thereof manufacturing it is not costly.

It can be mass produced, e.g., by a machine and therefore with little labor. As needed, the invention can be produced from metal, wood or plastic (for example: "waterjet" cutting for synthetic materials; folding and machining for metal; splitting for carpentry pieces of wood or similar materials; molding-injection for plastic).

In one implementation, the invention weighs about 880 g empty and between 2 kg and 4 kg with the accessories, according to their own weight.

The invention simplifies transport and is practical. The invention is easily carried on the shoulder like a rifle, or in the hand like a suitcase or even like a sport or golf bag. The invention can be tipped over safely without any equipment coming loose from the system 1.

Flexible human carrying structures (e.g., the strap 29) are attached onto the system 1 for grouped transport of rods, stakes and accessories.

The invention provides a vertical footed adjustable support for several rods (and/or "surf casting" stakes) mounted adjustably. The equipment can be held vertically between two sliding and immobilizable plates.

In fact, for the set of rods and/or stakes and/or boxes, several plates are adjustable along the vertical guide 6 by sliding, and immobilizable by clipping along a track 9 forming receiving rail parallel to the vertical guide 6.

The proposed invention offers in particular three functions:

1) rigidity;

2) centralization of the masses;

3) reduction of the hanging points.

With the invention, in addition to the rods and stakes, at least one box of specific accessories and also other boxes for example for bait can be loaded on.

In the example shown, the invention comprises:

1) A system 1 having at the base thereof, a sole 5 forming horizontal base onto which is attached a vertical guide 6 in order to form a rigid assembly.

2) On the rigid guide 6 at least two mobile plates come to be placed in a track 9 for the adjustment based on the size of the rods. Typically, a fixed plate receives the surf casting stakes 3.

3) Elastic clipping mechanisms (i.e., "clips") are mounted on the two plates in order for the rods and stakes to be immobilized that way.

4) If the person fishing H uses non-telescopic rods (or "single body"), the invention can be converted and can carry four stakes 3.

5) At least one detachable assembly, e.g., in stake form, is suited to be planted in loose ground and the service support for the fishing rods or similar. This detachable assembly comprises a plate for holding a box or case of accessories.

6) A pair of props, which can be assembled to the transport system 1, have movable tripod legs for holding rods or similar.

Naturally the invention is subject to variants. Although several embodiments have been described, it is understood that all these variants cannot be described and illustrated here exhaustively. It is of course conceivable to replace a means/step described by an equivalent without leaving the scope of the invention.

The following is the list of references in the figures:

| REFERENCE | DESIGNATION |
|---|---|
| 1 | carrying system |
| 2 | fishing rod |
| 3 | surf casting stake |
| 4 | fishing accessory |
| 5 | base sole |
| 6 | profiled rigid guide/front surface 6A |
| 7 | base elevation end |
| 8 | summit elevation end |
| 9 | profiled concave track |
| 10 | intermediate base plate |
| 11 | upper surface of base sole |
| 12 | housings for receiving base |
| 13 | preset transverse location |
| 14 | preset frontal location |
| 15 | intermediate threading plate |
| 16 | lower adjustable arrangement |
| 17 | through holes |
| 18 | intermediate immobilizing plate |
| 19 | adjustable middle arrangement |
| 20 | lateral openings |
| 21 | end part |
| 22 | clip mechanism |
| 23 | transverse passage opening out |
| 24 | upper support ranges |
| 25 | intermediate confinement plate |
| 25A | lateral throat |
| 26 | upper adjustable arrangement |
| 27 | lateral throat/27A: transverse side |
| 28 | arched receptacle opening out |
| 29 | carrying strap |
| 30 | rear surface/profiled rigid guide |
| 31 | projecting feet |
| 32 | V shaped bottom |
| 33 | tabs shaped like hooks |
| 34 | transverse median plane |
| 35 | passage spacing |
| 36 | front transverse surface |
| 37 | U-shaped jig |
| 38 | parallel branches |
| 39 | attaching loops |
| 40 | accessory forming prismatic box |
| 41 | convex biplanar bottom |
| 42 | support body |
| 43 | cam and knob mounting |
| 44 | cam |
| 45 | knob |
| 46 | central elevation column |
| 47 | rigid and removable attachment structures |
| 48 | frame for holding on the ground |
| 49 | transverse arm |
| 50 | movable and extendable props |
| 50A | frame ball-and-socket joints/props |
| 50B | hollow notched hangers |
| 51 | leg |
| 52 | upper end of leg |
| 53 | collar or open passage |
| 54 | projecting cylindrical finger |
| 55 | closed passage |
| 56 | complementary shape guide track |
| X | transverse direction |
| Y | frontal direction |
| Z | elevation direction |
| A | angle of approach |
| P | method for attaching |
| A | angle of approach |
| H | human user/person fishing |

The invention claimed is:

1. A carrying system for fishing accessories, the carrying system comprising:
one rigid profiled guide, one base sole and a plurality of intermediate plates;
wherein the guide extends in an elevation direction of the system and comprises one base elevation end and one summit elevation end;
wherein the guide comprises a track between the base and summit ends;
wherein the base sole extends perpendicularly to the elevation direction from the base elevation end and is rigidly attached to the guide;
wherein at least three of the intermediate plates extend perpendicularly to the elevation direction;
an intermediate base plate of the plurality of intermediate plates being rigidly attached on an upper surface of the sole, wherein the intermediate base plate comprises at least two receiving housings;
wherein each receiving housing is at a set location in the frontal direction and a transverse direction of the system, and the at least two housings are disposed on either side of the track in the transverse direction;
an intermediate threading plate of the plurality of intermediate plates being rigidly attached on the track by a lower adjustable arrangement for elevation adjustment;
wherein the threading plate is provided with at least two through holes, at least one of which is in a line with a corresponding one of the housing;
the base sole and the intermediate plates each extending from a single front surface of the guide in a frontal direction of the system;
wherein the track of the guide is concave and profiled between the base and summit ends;
wherein the at least three of the intermediate plates extend perpendicularly to the elevation direction and adjustably in the elevation direction between the sole and the summit end and the intermediate threading plate is rigidly attached on the profiled concave track by a lower adjustable arrangement for adjustment in elevation;
an intermediate immobilizing plate of the plurality of intermediate plates being rigidly attached on the track by a middle adjustable arrangement for elevation adjustment;
wherein the intermediate immobilizing plate is provided with at least two lateral openings, each respectively above, and frontally and transversely offset from a one of the housings and facing a corresponding through hole;
each lateral opening having an axis extending in the elevation direction and an elastically deformable clip mechanism with transverse passage opening out towards the outside of the immobilization plate, in the transverse direction; and
the intermediate immobilizing plate having at least two upper support ranges, with each range in the periphery of a respective one of the lateral openings,
wherein at least one of the intermediate threading plate and the intermediate immobilizing plate comprises a U-shaped jig including a lower and rigid base attached to an upper surface of the corresponding plate and whose two parallel branches extend in the elevation direction and are separated from each other in the transverse direction, wherein the guide comprises at least two elastically deformable loops separated from each other and from the U-shaped jig, wherein these loops are disposed for attaching a box onto the carrying system.

2. The carrying system according to claim 1, further comprising one intermediate tip confinement plate which is rigidly attached on the track by an upper adjustable arrangement for elevation adjustment;
wherein the intermediate tip confinement plate is provided with at least two lateral throats for tip protection;

at least one of the throats being opposite a lateral opening and a through hole and having an axis in the elevation direction; and at least one of the throats being disposed on a transverse side of the plate and forming an arc receptacle opening out in the transverse direction towards the outside of the system.

3. The carrying system according to claim 1, wherein the profiled rigid guide comprises at least one carrying strap rigidly connected to the guide both near the base sole and also to an immobilizing or confinement plate;

wherein the at least one carrying strap is made rigidly connected by attachment to a rear surface of the guide opposite in the frontal direction to the intermediate plates.

4. The carrying system according to claim 1, wherein the base sole comprises on a lower surface at least three feet projecting to the outside of the carrying system in at least one of the elevation and frontal directions.

5. The carrying system according to claim 1, wherein the intermediate base plate comprises three housings, disposed in a triangle whose base is parallel to the transverse direction and whose point opposite the base in the frontal direction defines a central housing in front of the base and opposite the guide in this frontal direction.

6. The carrying system according to claim 1, wherein the intermediate threading plate comprises three through holes, at least one of which being opposite a base receiving housing of the intermediate base plate;

wherein the three through holes are disposed in a triangle whose base is parallel to the transverse direction.

7. The carrying system according to claim 1, wherein the intermediate immobilizing plate has a "T" shape perpendicular to the elevation direction and comprises at least four lateral openings, of which two lateral openings with clip mechanism and passage and also two central openings are aligned in the frontal direction.

8. The carrying system according to claim 1, wherein each elastically deformable clip mechanism with passage from the intermediate immobilizing plate comprises a V-shaped bottom jointly molded with this plate and two hook shaped elastically deformable tabs, one opposite the other in a frontal and transverse median plane of the plate, with the passage whose dimension in the frontal direction being less than a corresponding passage spacing between a front end and a rear end of the V-shaped bottom.

9. The carrying system according to claim 8, wherein the intermediate immobilizing plate has a T-shape perpendicular to the elevation direction and comprises at least two V-shaped openings, on opposite sides transversely of the guide and opening out to a front transverse surface of the intermediate immobilization plate.

10. The carrying system according to claim 1, further comprising an intermediate confinement plate provided with two lateral throats and one central throat located between the two lateral throats and opening out to a transverse front surface of this plate, wherein the two lateral throats are inscribed in a circular profile and the central throat is inscribed in a profile elongated in the frontal direction from the front surface of the plate and defines a convex biplanar bottom towards the front of the central throat.

11. The carrying system according to claim 1, wherein at least one of the lower, middle and upper adjustable arrangements for an intermediate tip protection plate comprise a support body for the corresponding plate and a cam and knob mounting wherein the cam is by default in sliding hold with the profiled concave track and wherein the knob by screwing presses together under pressure and immobilizes the mounting of the corresponding plate relative to the track in an immobilized position in the elevation direction between the base and summit elevation ends.

12. The carrying system according to claim 1, wherein the carrying system comprises removable attachment structures for assembling a frame on a rear surface of the rigid guide, wherein the frame comprises:

a central elevation column;

a transverse arm substantially at the level of the summit elevation end at the summit of the column;

two movable and extendable props, at lateral ends of the transverse arm; and two hollow notched hangers, rigidly mounted at one upper end and transversely on either side of the column.

13. The carrying system according to claim 1, further comprising a fishing rod carrying stake for recreational fishing, wherein the stake has at an upper end of the leg thereof a horseshoe collar, open on the opposite side of the leg in the frontal direction and provided with a cylindrical finger on the outer periphery thereof and projecting in the transverse direction;

the stake also having at a middle location in elevation on the leg thereof a circular collar defining a closed passage which is across from a space for stake passage inside the collar;

the finger being complementary to a complementary guide track of a fishing accessory forming box; and the stake and the box being integrated with the carrying system.

14. A method for attachment onto the carrying system according to claim 1, of one or more of: a fishing rod and a holding stake wherein the rod or stake is slid along an approach angle through one of the through holes of the intermediate threading plate and then a lower base of the rod or stake is received in one of the openings of the intermediate immobilizing plate, after which the rod or the stake is adjusted parallel to the elevation direction for being lodged through the passage and then immobilized by one of the corresponding mechanisms of the intermediate immobilizing plate, wherein an upper end of the rod or the stake is received in one of the corresponding throats of the intermediate tip confinement plate.

15. A carrying system for fishing accessories, the carrying system comprising:

one rigid profiled guide, one base sole and a plurality of intermediate plates;

wherein the guide extends in an elevation direction of the system and comprises one base elevation end and one summit elevation end;

wherein the guide comprises a track between the base and summit ends;

wherein the base sole extends perpendicularly to the elevation direction from the base elevation end and is rigidly attached to the guide;

wherein at least three of the intermediate plates extend perpendicularly to the elevation direction;

an intermediate base plate of the plurality of intermediate plates being rigidly attached on an upper surface of the sole, wherein the intermediate base plate comprises at least two receiving housings;

wherein each receiving housing is at a set location in the frontal direction and a transverse direction of the system, and the at least two housings are disposed on either side of the track in the transverse direction;

an intermediate threading plate of the plurality of intermediate plates being rigidly attached on the track by a lower adjustable arrangement for elevation adjustment;

wherein the threading plate is provided with at least two through holes, at least one of which is in a line with a corresponding one of the housings;

the base sole and the intermediate plates each extending from a single front surface of the guide in a frontal direction of the system;

wherein the track of the guide is concave and profiled between the base and summit ends;

wherein the at least three of the intermediate plates extend perpendicularly to the elevation direction and adjustably in the elevation direction between the sole and the summit end and the intermediate threading plate is rigidly attached on the profiled concave track by a lower adjustable arrangement for adjustment in elevation;

an intermediate immobilizing plate of the plurality of intermediate plates being rigidly attached on the track by a middle adjustable arrangement for elevation adjustment;

wherein the intermediate immobilizing plate is provided with at least two lateral openings, each respectively above, and frontally and transversely offset from one of the housings and facing a corresponding through hole;

each lateral opening having an axis extending in the elevation direction and an elastically deformable clip mechanism with transverse passage opening out towards the outside of the immobilization plate, in the transverse direction;

the intermediate immobilizing plate having at least two upper support ranges, with each range in the periphery of a respective one of the lateral openings; and wherein at least one of the intermediate threading plate and the intermediate immobilizing plate comprises a U-shaped jig including a lower and rigid base attached to an upper surface of the corresponding plate and wherein the system further has at least two feet that comprise rotatable support members in line with a rear surface of the guide and that are separated from each other in the transverse direction.

16. The carrying system according to claim 15, wherein the rotatable support members comprise casters.

17. The carrying system according to claim 15, wherein the rotatable support members comprise wheels.

18. The carrying system according to claim 17, further comprising one intermediate tip confinement plate which is rigidly attached on the track by an upper adjustable arrangement for elevation adjustment;

wherein the intermediate tip confinement plate is provided with at least two lateral throats for tip protection;

at least one of the throats being opposite a lateral opening and a through hole and having an axis in the elevation direction; and at least one of the throats being disposed on a transverse side of the plate and forming an arc receptacle opening out in the transverse direction towards the outside of the system.

19. A carrying system for fishing accessories, the carrying system comprising:

one rigid profiled guide, one base sole and a plurality of intermediate plates;

wherein the guide extends in an elevation direction of the system and comprises one base elevation end and one summit elevation end;

wherein the guide comprises a track between the base and summit ends;

wherein the base sole extends perpendicularly to the elevation direction from the base elevation end and is rigidly attached to the guide;

wherein at least three of the intermediate plates extend perpendicularly to the elevation direction;

an intermediate base plate of the plurality of intermediate plates being rigidly attached on an upper surface of the sole, wherein the intermediate base plate comprises at least two receiving housings;

wherein each receiving housing is at a set location in the frontal direction and a transverse direction of the system, and the at least two housings are disposed on either side of the track in the transverse direction;

an intermediate threading plate of the plurality of intermediate plates being rigidly attached on the track by a lower adjustable arrangement for elevation adjustment;

wherein the threading plate is provided with at least two through holes, at least one of which is in a line with a corresponding one of the housings;

the base sole and the intermediate plates each extending from a single front surface of the guide in a frontal direction of the system;

wherein the track of the guide is concave and profiled between the base and summit ends;

wherein the at least three intermediate plates extend perpendicularly to the elevation direction and adjustably in the elevation direction between the sole and the summit end and the intermediate threading plate is rigidly attached on the profiled concave track by a lower adjustable arrangement for adjustment in elevation;

an intermediate immobilizing plate of the plurality of intermediate plates being rigidly attached on the track by a middle adjustable arrangement for elevation adjustment;

wherein the intermediate immobilizing plate is provided with at least two lateral openings, each respectively above, and frontally and transversely offset from one of the housings and facing a corresponding through hole;

each lateral opening having an axis extending in the elevation direction and an elastically deformable clip mechanism with transverse passage opening out towards the outside of the immobilization plate, in the transverse direction;

the intermediate immobilizing plate having at least two upper support ranges, with each range in the periphery of a respective one of the lateral openings; and wherein at least one of the intermediate threading plate and the intermediate immobilizing plate comprises a U-shaped jig including a lower and rigid base attached to an upper surface of the corresponding plate and whose two parallel branches extend in the elevation direction, and wherein the carrying system comprises on a rear surface of the rigid profile guide a frame for holding to the ground that is removably attached to the rear surface of the rigid profile guide by removable attachment structures, wherein the frame for holding to the ground comprises:

a central elevation column;

a transverse arm rigidly attached to the central elevation column at a level of a summit elevation end substantially at the summit of the central elevation column; the transverse arm having ball-and-socket joints at each of lateral ends of the transverse arm;

two movable and extendable props, each articulated on one of the ball-and socket joints at lateral ends of the transverse arm; and two hollow notched hangers, rigidly mounted substantially above the summit of the central elevation column, at one upper end of the central elevation column and transversely extending from either side of the frame for holding to the ground.

20. The carrying system according to claim 19, further comprising one intermediate tip confinement plate which is rigidly attached on the track by an upper adjustable arrangement for elevation adjustment;

wherein the intermediate tip confinement plate is provided with at least two lateral throats for tip protection;

at least one of the throats being opposite a lateral opening and a through hole and having an axis in the elevation direction; and at least one of the throats being disposed on a transverse side of the plate and forming an arc receptacle opening out in the transverse direction towards the outside of the system.

\* \* \* \* \*